United States Patent
Ma et al.

(10) Patent No.: US 9,256,096 B2
(45) Date of Patent: Feb. 9, 2016

(54) LIQUID CRYSTAL DISPLAY WITH EMBEDDED TOUCH PANEL AND METHOD OF MANUFACTURING THE SAME

(71) Applicant: Shanghai Tianma Micro-Electronics Co., Ltd., Shanghai (CN)

(72) Inventors: Jun Ma, Shanghai (CN); Lijun Zhao, Shanghai (CN); Tieer Gu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 174 days.

(21) Appl. No.: 13/956,216

(22) Filed: Jul. 31, 2013

(65) Prior Publication Data
US 2014/0184940 A1   Jul. 3, 2014

(30) Foreign Application Priority Data
Dec. 31, 2012   (CN) .......................... 2012 1 0594388

(51) Int. Cl.
*G02F 1/1335* (2006.01)
*G02F 1/1333* (2006.01)
*G06F 3/041* (2006.01)
*G06F 3/044* (2006.01)

(52) U.S. Cl.
CPC ............ *G02F 1/13338* (2013.01); *G06F 3/044* (2013.01); *G06F 3/0412* (2013.01); *G06F 2203/04103* (2013.01)

(58) Field of Classification Search
CPC ....... G06F 3/044; G06F 3/041; G06F 3/0412; G06F 3/0416; G06F 3/0418; G06F 3/03547; G06F 3/0414
USPC ............. 349/12, 106, 110; 354/173, 174, 206
See application file for complete search history.

(56) References Cited

U.S. PATENT DOCUMENTS

| 2011/0242027 | A1 | 10/2011 | Chang | |
|---|---|---|---|---|
| 2011/0291963 | A1* | 12/2011 | Woo et al. | 345/173 |
| 2012/0075214 | A1* | 3/2012 | Kim | 345/173 |
| 2012/0206403 | A1* | 8/2012 | Wang et al. | 345/174 |
| 2013/0135540 | A1* | 5/2013 | Nam et al. | 349/12 |
| 2013/0215366 | A1* | 8/2013 | Chen | 349/106 |
| 2014/0320761 | A1* | 10/2014 | Misaki | 349/12 |
| 2015/0054803 | A1* | 2/2015 | Yashiro et al. | 345/206 |

FOREIGN PATENT DOCUMENTS

CN   101498851 A   8/2009

* cited by examiner

*Primary Examiner* — Huyen Ngo
(74) *Attorney, Agent, or Firm* — Alston & Bird LLP

(57) ABSTRACT

A liquid crystal display having an embedded touch panel is disclosed. The display includes a color filter substrate, an array substrate, a liquid crystal molecule layer between the color filter substrate and the array substrate, and a touch panel integrated with the color filter substrate. A plurality of first transfer pads are arranged on the color filter substrate and a plurality of second transfer pads are arranged on the array substrate, where locations of the first transfer pads correspond to locations of the second transfer pads. The first transfer pads are electrically connected with the second transfer pads, and the first and second transfer pads are used to transmit a touch control signal to the touch panel.

15 Claims, 4 Drawing Sheets a b

LIQUID CRYSTAL DISPLAY WITH EMBEDDED TOUCH PANEL AND METHOD OF MANUFACTURING THE SAME

CROSS-REFERENCES TO RELATED APPLICATIONS

This application claims priority to Chinese patent application No. 201210594388.3, filed on Dec. 31, 2012 and entitled "LIQUID CRYSTAL DISPLAY WITH EMBEDDED TOUCH PANEL AND METHOD OF MANUFACTURING THE SAME", the contents of which is incorporated herein by reference in its entirety.

FIELD OF THE INVENTION

The present invention relates to the field of liquid crystal displays, and in particularly to a liquid crystal display with an embedded touch panel and a method of manufacturing the liquid crystal display.

BACKGROUND OF THE INVENTION

With the development of embedded touch screen technologies, various manufacturers have gradually developed various technical solutions. Important characteristics of the solution represented by Apple Inc. and Synopsys Inc. lie in that: an integrated Chip On Glass (COG) having a display driving circuit, a display control chip and a touch controller is used; and a touch control function is integrated on an array substrate of the display through adding a photomask or forming a new mask pattern.

In recent years, it is increasingly demanding for a display to integrate a touch control function. Despite of the implementation of the integration of touch control and display, the above described display integration solution causes problems of a high cost and a low yield rate, such that a screen having only the display function cannot be compatible with the panel having the touch control function in the terms of design and technics.

For example, a Chinese patent application No. CN200910111278.5 discloses a touch panel and a liquid crystal display. This invention relates to an embedded touch panel and a liquid crystal display, where a sense line is provided parallel to and over a date line of the array substrate of an active unit, and a sense unit is arranged on a scan line, so that the sense line over the date line creates current by virtue of the external voltage while the scan line produces slight leakage of electricity, to mark X and Y coordinates of a touch point. For the purpose of the touch control function, sensing electrodes are integrated on the array substrate, thereby reducing the aperture ratio of the display panel.

In the prior art, the embedded touch panel cannot be compatible with a panel having only the display function in terms of design and technics, which brings significant difficulties for enhancing the flexibility of the product design, and the touch control performance of the present embedded touch panel is also needed to be improved.

BRIEF SUMMARY OF THE INVENTION

One inventive aspect is a liquid crystal display having an embedded touch panel. The display includes a color filter substrate, an array substrate, a liquid crystal molecule layer between the color filter substrate and the array substrate, and a touch panel integrated with the color filter substrate. A plurality of first transfer pads are arranged on the color filter substrate and a plurality of second transfer pads are arranged on the array substrate, where locations of the first transfer pads correspond to locations of the second transfer pads. The first transfer pads are electrically connected with the second transfer pads, and the first and second transfer pads are used to transmit a touch control signal to the touch panel.

Another inventive aspect is a method of manufacturing a liquid crystal display with an embedded touch panel. The method includes providing a color filter substrate including a plurality of first transfer pads, providing an array substrate including a plurality of second transfer pads, and attaching the color filter substrate to the array substrate. The method also includes connecting the first transfer pads on the color filter substrate with the second transfer pads on the array substrate, injecting a liquid crystal molecule layer between the color filter substrate and the array substrate, and sealing the liquid crystal molecule layer with a seal agent.

DETAILED DESCRIPTION OF THE INVENTION

The invention will be further described in detail with reference to the accompanying drawings and the embodiments. It should be understood that the embodiments described herein are intended merely to explain but not to limit the invention. In addition, it would be further noted that the accompanying drawings only illustrate partial structures associated with the invention instead of all structures, for the sake of description.

A First Embodiment

Figure 1:
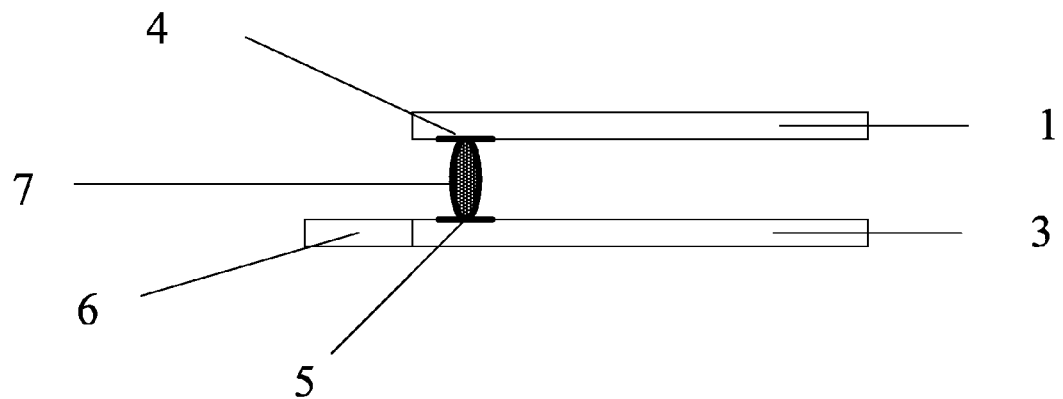
FIG. 1 is a schematic view of a sectional structure of a liquid crystal display with an embedded touch panel according to a first embodiment of the invention.

The first embodiment provides a structure for a liquid crystal display with an embedded touch panel and a method of manufacturing the display. FIG. 1 illustrates a schematic cross-sectional view of a structure of such liquid crystal display. As shown in FIG. 1, the liquid crystal display includes: a color filter substrate 1; an array substrate 3; a liquid crystal molecule layer (not shown) sandwiched between the color filter substrate 1 and the array substrate 3; a first transfer pad 4 provided on the color filter substrate 1; and a second transfer pad 5 provided on the array substrate, where the first transfer pad 4 and the second transfer pad 5 correspond to each other in a one-to-one relationship and are electrically connected through a ball bond 7, such as a gold ball bond.

FIG. 1 only schematically illustrates the cross-sectional view of one transfer pad, and the number of the first transfer pads 4 may be at least 20. The first transfer pad 4 and the second transfer pad 5 may be shaped as a rectangle, a triangle, a trapezoid, a circle, etc. In some embodiments, the transfer pad is shaped as a rectangle with a size from 50 μm×50 μm to 1000 μm×1000 μm.

Figure 2:
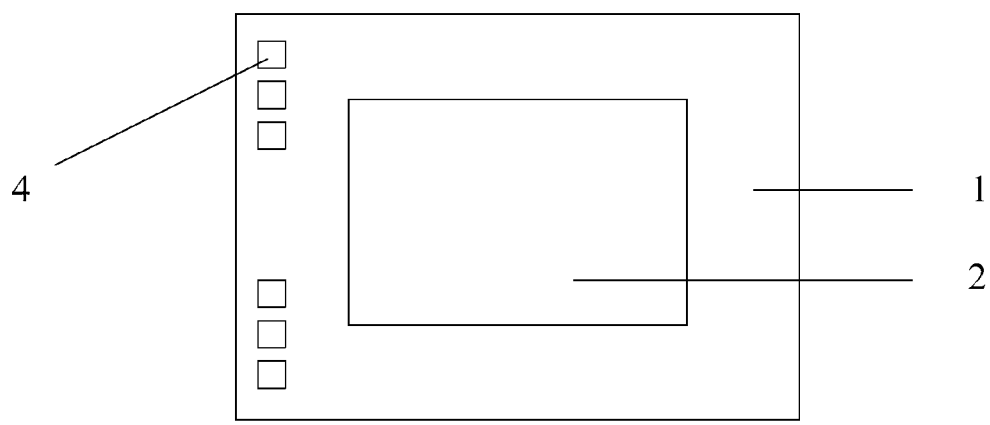
FIG. 2 is a schematic top view of a color filter substrate and an array substrate of the liquid crystal display according to the first embodiment of the invention.
Figure 2:
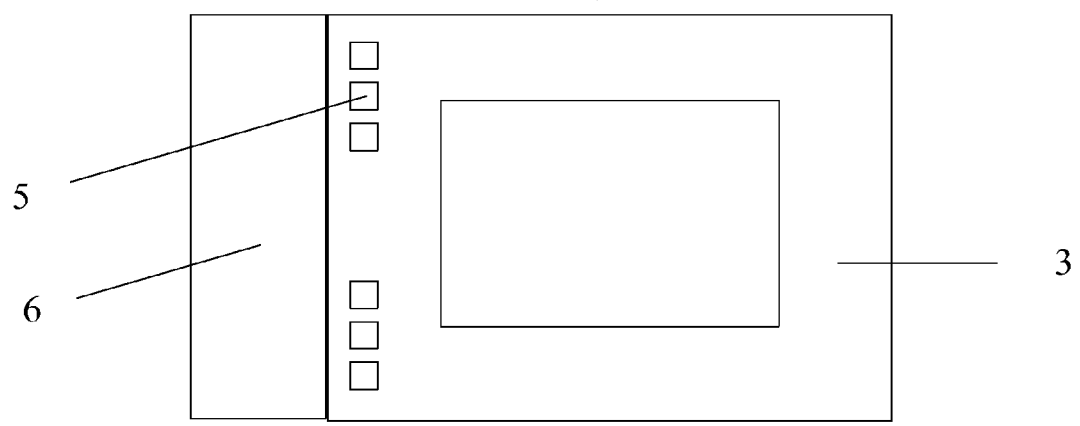

As shown in FIG. 2a, the first transfer pads 4 are provided in the region of the color filter substrate 1 that is outside of an effective display region 2 of the color filter substrate 1. Specifically, in this embodiment, the first transfer pads 4 are formed at corner positions of a signal transmitting side of the color filter substrate 1. As shown in FIG. 2b, the second transfer pads 5 are provided in the region of the array substrate 3 that is outside of an effective display region of the array substrate 3. Specifically, in this embodiment, the second transfer pads 5 are formed at positions in the array substrate 3 adjacent to a stage of an array substrate 6, that is formed in a signal transmitting side of the array substrate. The stage of an array substrate may be used to connect an external circuit.

FIG. 2a only illustrates the case that three first transfer pads 4 are arranged at one side and other three first transfer pads 4 are arranged at the other side, however, the first transfer pads may also be formed at a middle position of the single transmitting side of the color filter substrate. In some embodiments, the first transfer pads may be distributed evenly along the single transmitting side of the color filter substrate.

Likewise, FIG. 2b only illustrates the case that three second transfer pads 5 are arranged at one side and other three second transfer pads 5 are arranged at the other side, however, the second transfer pads may also be formed at a middle position of a single transmitting side of the array substrate. In some embodiments, the second transfer pads may be distributed evenly along the single transmitting side of the array substrate.

Figure 3:
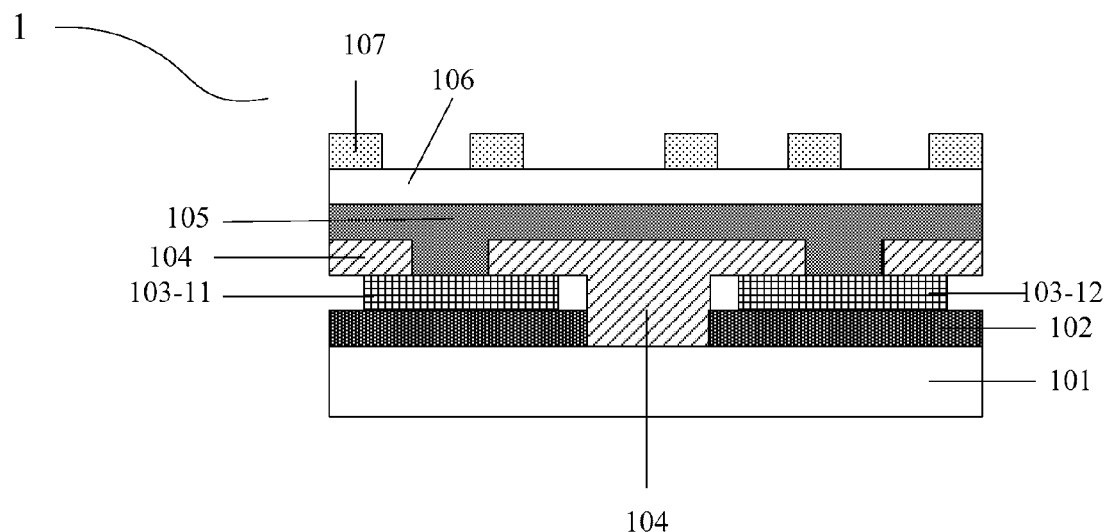
FIG. 3 is a schematic view of a sectional structure of the color filter substrate of the liquid crystal display according to the first embodiment of the invention.

FIG. 3 illustrates a schematic view of a structure of the color filter substrate 1 according to some embodiments. As shown in FIG. 3, the color filter substrate 1 includes: a substrate 101 which is a transparent insulated substrate such as a glass substrate, a plastic substrate and the like; and a black matrix layer 102 arranged on the substrate 101. The black matrix unit may include strips crossed with each other, as shown in the top view of the black matrix layer in FIG. 4. The color filter substrate 1 also includes blank regions 110, which are defined by the crossed strips of the black matrix layer. The black matrix layer may include a light shielding metal such as chromium, aluminum, etc. It should be understood by those skilled in the art that FIG. 4 only schematically illustrates a part but not all of the black matrix layers on the substrate, and the shape of the black matrix units could be changed as desired.

The first metal layer 103 is arranged on the black matrix layer 102. In addition, the shape of the first metal layer 103 is the same as that of the black matrix layer and the line width of the first metal layer 103 is less than that of the black matrix units. Accordingly, once the color filter substrate is attached to the array substrate to form the liquid crystal display, the first metal layer 103 is sheltered by the black matrix layer 102 without affecting the transmittance of the liquid crystal display. The first metal layer may include at least one of molybdenum (Mo) and aluminum (Al).

Figure 5:
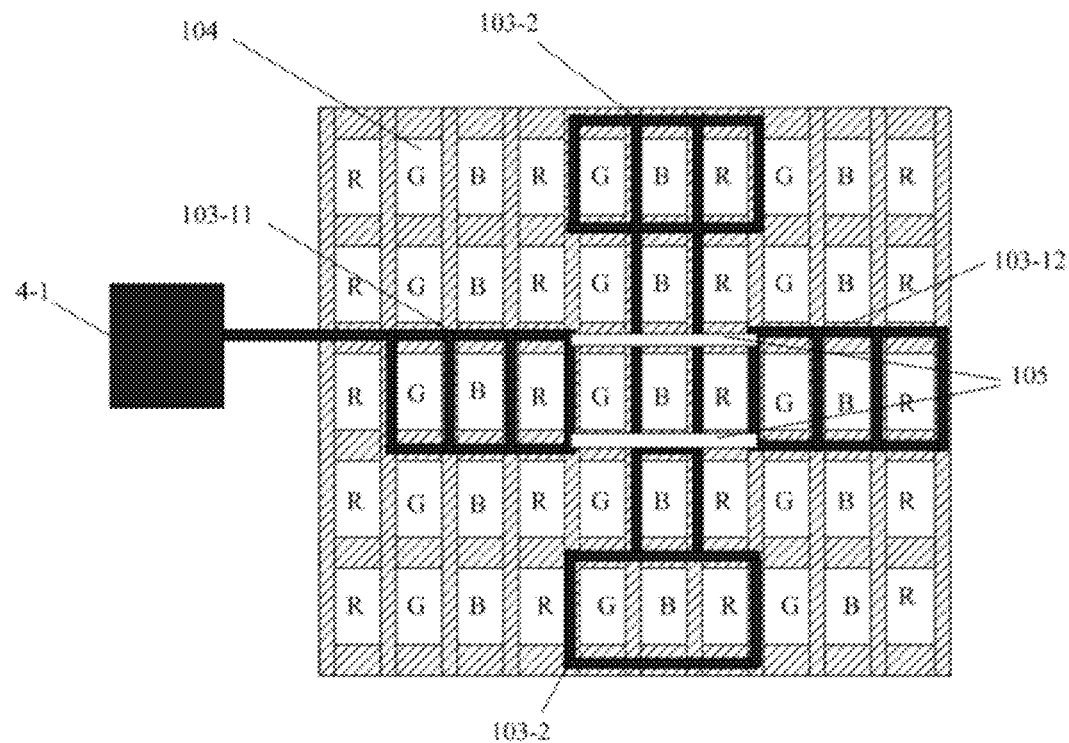
FIG. 5 is a schematic top view of a first metal layer and a transfer pad (i.e. conducting pad) in the color filter substrate according to the first embodiment of the invention.

The first metal layer 103 includes: a plurality of first sensing electrodes continuously arranged in a longitudinal direction such as first sensing electrodes 103-2 shown in FIG. 5, and a plurality of second sensing electrodes such as second sensing electrodes 103-11 and 103-12 shown in FIG. 5, which are spaced by the continuously arranged first sensing electrodes 103-2 in a transverse direction.

The color filter layer 104 is provided on the first metal layer 103 and a variety of sub-pixel units such as red (R), green (G) and blue (B) sub-pixel units are formed in the blank regions 110. The color filter layer 104 may be made of the insulating resin material, and the positions of the intersections between the first sensing electrodes 103-2 and the second sensing electrodes 103-11, 103-12 formed in the first metal layer 103 may also be covered by the color layer 104.

A metal bridge 105 formed by the second metal layer is arranged on the color filter layer 104 and directly contacts the second sensing electrodes 103-11, 103-12 through via holes in the color filter layer 104, thereby electrically connecting the adjacent second sensing electrodes 103-11 and 103-12. In the shown embodiment, the first sensing electrode 103-2 is used as a sense line of the touch panel, and the second sensing electrodes 103-11, 103-12 which are electrically connected to each other integrally by the metal bridge 105 are used as a drive line of the touch panel. Alternatively, it is also possible that the first sensing electrode 103-2 is used as the drive line of the touch panel and the second sensing electrodes 103-11, 103-12 which are electrically connected to each other integrally by the metal bridge 105 are used as the sense line of the touch panel. The second metal layer 105, the first metal layer 103, and the electrically insulated color filter layer 104 therebetween are included in the touch panel such that the color filter substrate integrated with the touch panel is implemented. The second metal layer may include one or more of Mo and Al, etc. FIG. 5 illustrates only one touch control unit of the touch panel which is integrated in the color filter layer and includes a plurality of such touch control units.

The schematic diagram of a sectional structure in FIG. 3 only illustrates such a portion of the second sensing electrodes 103-11, 103-12 in the first metal layer 103 that is connected by the bridge of the second metal layer 105, but does not illustrate the first sensing electrodes continuously arranged in the longitudinal direction.

An organic layer 106 and an isolation layer 107 made of, for example, resin are arranged sequentially on the color filter layer.

Figure 6:
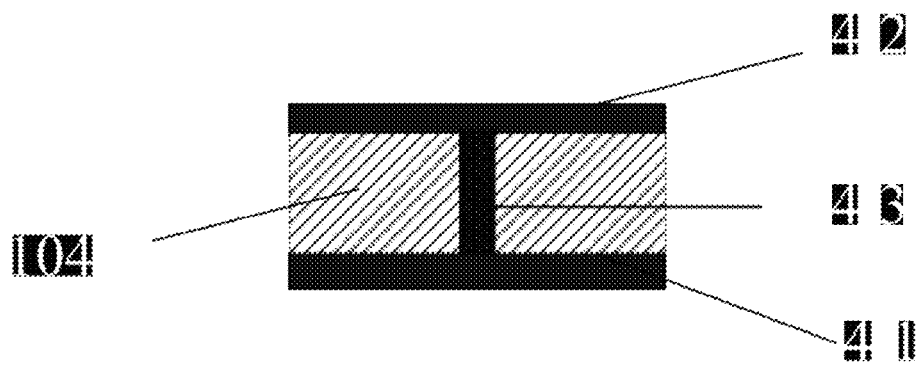
FIG. 6 is a schematic view of a sectional structure of the transfer pad of the color filter substrate according to the first embodiment of the invention.

As shown in FIG. 6, the first transfer pad 4 placed on the color filter substrate 1 includes a lower metal layer 4-1, an upper metal layer 4-2 and the color filter layer 104 arranged between the lower metal layer 4-1 and the upper metal layer 4-2. The first transfer pad 4 also includes one or more via holes 4-3 in the color filter layer 104, and the upper and lower metal layers are electrically connected together by the metal in the via hole 4-3. As shown in FIG. 5, the lower metal layer 4-1 of the first transfer pad 4 is connected to the second sensing electrode 103-11 in the first metal layer of the touch panel. Thus, it is possible for a touch control signal to be transmitted from the first transfer pad to the second sensing electrode. FIG. 5 only illustrates the case of the connection of one first transfer pad with the second sensing electrode in one touch control unit, but the first transfer pad may also be connected to the first sensing electrode in the touch control unit. The upper metal layer 4-2 in the first transfer pad 4 is connected to the second transfer pad 5 on the array substrate 3 by the ball bond 7.

In the array substrate, an Integrated Circuit (IC) provides the touch control signal. Through a flexible printed circuit (FPC) pressed on the second transfer pad of the array substrate, the touch control signal is transmitted to the first transfer pad 4 arranged on the color filter substrate via the second transfer pad 5 and further to the sensing electrodes of the color filter substrate. Here, the IC can be arranged on the printed circuit board or the flexible printed circuit, or pressed directly on the array substrate.

The method of manufacturing the color filter substrate is as follows.

Figure 7:
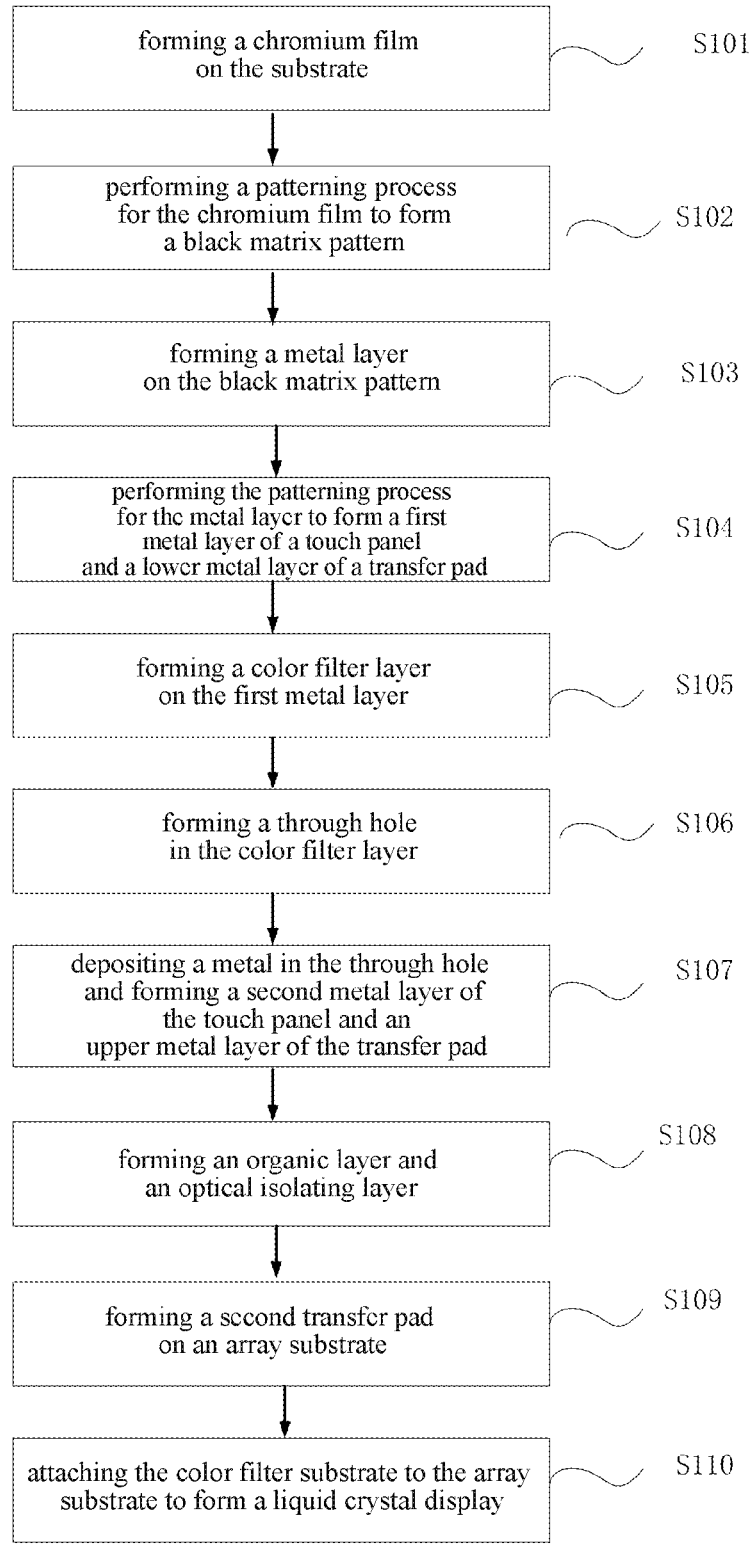
FIG. 7 is a flow chart of a process of manufacturing the liquid crystal display according to the first embodiment of the invention.

FIG. 7 shows a flow chart of the process of manufacturing the color filter substrate according to some embodiments. A washed glass substrate is placed on a transfer bracket and then transferred into a sputtering device, in which a chromium film is deposited on the glass substrate by a reactive sputtering, as shown in Step S101 of FIG. 7.

Figure 4:
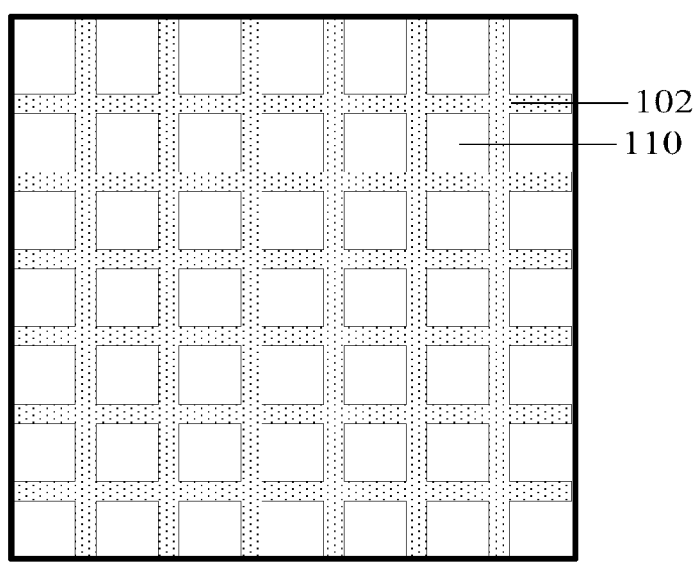
FIG. 4 is a schematic top view of the profile of a black matrix layer in the color filter substrate according to the first embodiment of the invention.

A patterning process is performed on the chromium film by way of mask exposure so as to form a black matrix layer, as shown in Step S102 of FIG. 7. FIG. 4 shows a top view of an embodiment of the black matrix layer 102 obtained from the patterning process, and a black matrix unit consists of strips crossed with each other, which define blank regions 110. It should be understood by those skilled in the art that FIG. 4 schematically shows only a portion not all of the black matrix layers 102 on the substrate, and the shape of the black matrix units may be changed as desired.

Likewise, a metal layer, which may be made of Mo or Al, etc., is formed on the substrate by the reactive sputtering, as shown in Step S103 of FIG. 7. The metal layer is not only formed on the black matrix layer but also extends partially to the outside of an effective light-emitting region. The metal layer extending to the outside of the effective light-emitting region is patterned to form a square block structure used as the lower metal layer 4-1 of the first transfer pad, as shown in Step S104 of FIG. 7.

The first metal layer formed on the black matrix layer is likewise patterned to form a grid structure which is similar to the pattern of the black matrix layer and used as a first metal layer 103 of the touch panel, the shape of the first metal layer 103 is the same as that of the black matrix layer but the line width of the first metal layer 103 is less than that of the black matrix units, such that when the color filter substrate is attached to the array substrate to form the liquid crystal display, the first metal layer 103 is sheltered by the black matrix layer without affecting the transmittance of the liquid crystal display. In this embodiment, the first metal layer 103 includes: a plurality of first sensing electrodes (such as the first sensing electrode 103-2 in FIG. 3) continuously arranged in a longitudinal direction, and a plurality of second sensing electrodes (such as the second sensing electrodes 103-11 and 103-12 in FIG. 5) spaced by the continuously arranged first sensing electrodes in a transverse direction.

A color filter layer 104 is formed on the first metal layer 103, as show in Step S105 of FIG. 7. The color filter layer covers positions of the intersections between the first sensing electrodes 103-2 and the second sensing electrodes 103-11, 103-12 formed in the first metal layer 103. In addition, a variety of sub-pixel units such as red (R), green (G) and blue (B) sub-pixel units are formed in the above blank regions 110.

The color filter layer also covers the lower metal layer 4-1 of the first transfer pad.

A via hole is formed in the color filter layer covering the second sensing electrodes 103-11, 103-12, as shown in Step S106 of FIG. 7. Metal is deposited in the via hole, as shown in Step S107 of FIG. 7, and the second metal layer 105 for bridging the second sensing electrodes 103-11, 103-12 is formed, such that the second sensing electrodes 103-11, 103-12 are electrically connected, as shown in FIG. 5.

Likewise, a via hole is also formed in the color filter layer covering the lower metal layer 4-1 of the first transfer pad, metal is deposited in the via hole, and the upper metal layer 4-2 of the first transfer pad is formed on the color filter layer.

This step may be conducted simultaneously with the above step of manufacturing the second metal layer 105 of the touch panel and the same metal material may be deposited in both steps. Any step between the transfer pad and the other region on the color filter substrate 1 is very small, for the purpose of flatness.

The organic layer 106 and the isolation layer 107 are formed, as shown in Step S108 of FIG. 7, and the techniques of manufacturing the organic layer and the optical isolating layer is common in forming the color filter substrate, and thus will not be described herein.

The second transfer pad 5 corresponding to the first transfer pad 4 on the color filter substrate in a one-to-one relationship is formed on the array substrate 3, as shown in Step S109 of FIG. 7. The color filter substrate is attached to the array substrate to form the liquid crystal display, as shown in Step S110 of FIG. 7. The first transfer pad and the second transfer pad are electrically connected through the ball bond 7. In this case, through a flexible printed circuit (FPC) pressed on the second transfer pad on the array substrate, a touch control signal provided by the IC is transmitted to the first transfer pad 4 arranged on the color filter substrate via the second transfer pad 5 and further to the sensing electrodes of the color filter substrate.

A Second Embodiment

The second embodiment provides a structure for a liquid crystal display with an embedded touch panel and a method of manufacturing the display. FIG. 1 illustrates a schematic cross-sectional view of a structure of such liquid crystal display. As shown in FIG. 1, the liquid crystal display includes: a color filter substrate 1; an array substrate 3; a liquid crystal molecule layer (not shown) sandwiched between the color filter substrate 1 and the array substrate 3; a first transfer pad 4 provided on the color filter substrate 1; and a second transfer pad 5 provided on the array substrate 3. The first transfer pad 4 and the second transfer pad 5 correspond to each other in a one-to-one relationship and are electrically connected through a ball bond 7, such as a gold ball bond.

FIG. 1 only schematically illustrates the cross-sectional view of one transfer pad, and the number of the first transfer pads may be at least 20. The first transfer pad and the second transfer pad may be shaped as a rectangle, a triangle, a trapezoid, etc. In some embodiments, the transfer pad is shaped as a rectangle with a size from 50 μm×50 μm~1000 μm×1000 μm.

As shown in FIG. 2a, the first transfer pads 4 are provided in the region of the color filter substrate 1 that is outside of an effective display region of the color filter substrate 1. Specifically, in this embodiment, the first transfer pads are formed at corner positions of a signal transmitting side of the color filter substrate 1. As shown in FIG. 2b, the second transfer pads 5 are provided in the region of the array substrate 3 that is outside of an effective display region of the array substrate 3. Specifically, in this embodiment, the second transfer pads 5 are formed at positions in the array substrate 3 adjacent to a stage of an array substrate 6, that is formed in a signal transmitting side of the array substrate.

FIG. 2a only illustrates the case that three first transfer pads 4 are arranged at one side and other three first transfer pads 4 are arranged at the other side, however, the first transfer pads may also be formed at a middle position of the single transmitting side of the color filter substrate. In some embodiments, the first transfer pads may be distributed evenly along the single transmitting side of the color filter substrate.

Likewise, FIG. 2b only illustrates the case that three second transfer pads 5 are arranged at one side and other three second transfer pads 5 are arranged at the other side, however, the second transfer pads may also be formed at a middle position of a single transmitting side of the array substrate. In some embodiments, the second transfer pads may be distributed evenly along the single transmitting side of the array substrate.

The difference between the first embodiment and the second embodiment lies in the structure of the color filter substrate.

In the second embodiment, the color filter substrate includes: a substrate which is a transparent insulated substrate such as a glass substrate, a plastic substrate and the like, and a black matrix layer arranged on the substrate. The black matrix unit may include strips crossed with each other, and blank regions, which are defined by the strips of the black matrix layer. The black matrix layer may include a light shielding metal such as chromium, aluminum, etc. It should be understood by those skilled in the art that the shape of the black matrix units could be changed as desired.

The first metal layer is arranged on the black matrix layer, the shape of the first metal layer is the same as that of the black matrix layer and the line width of the first metal layer is less than that of the black matrix units, such that when the color filter substrate is attached to the array substrate to form the liquid crystal display, the first metal layer can be sheltered by the black matrix layer without affecting the transmittance of the liquid crystal display. The first metal layer may be made of molybdenum (Mo) or aluminum (Al).

The first metal layer includes: a plurality of first sensing electrodes continuously arranged in a longitudinal direction; and a plurality of second sensing electrodes spaced by the continuously arranged first sensing electrodes in a transverse direction.

A first organic layer, which may be made of an electrically insulating resin material, is provided on the first metal layer 103, and the positions of the intersections between the first sensing electrodes and the second sensing electrodes formed in the first metal layer may also be covered by the first organic layer.

A metal bridge formed by the second metal layer is arranged on the first organic layer and directly contacts the second sensing electrodes through the via hole s of the first organic layer, thereby electrically connecting the adjacent second sensing electrodes. In this embodiment, the first sensing electrode is used as a sense line of the touch panel, and the second sensing electrodes which are electrically connected to each other integrally by the metal bridge are used as a drive line of the touch panel. Alternatively, it is also possible that the first sensing electrode is used as the drive line of the touch panel and the second sensing electrodes which are electrically connected to each other integrally by the metal bridge are used as the sense line of the touch panel. The second metal layer, the first metal layer, and the first organic layer therebetween are included in the touch panel such that the color filter substrate integrated with the touch panel is implemented. The second metal layer may be made of Mo or Al, etc.

The color filter layer, a second organic layer which may be made of resin and the isolation layer which may be made of resin are arranged sequentially on the organic layer, which is a conventional structure of the color filter substrate in the art, and thus will not be described herein.

The first transfer pad placed on the color filter substrate includes a lower metal layer, an upper metal layer and the organic layer arranged between the lower metal layer and the upper metal layer. The first transfer pad also includes one or more via holes in the organic layer, and the upper and lower metal layers are electrically connected together by the metal in the via hole. The lower metal layer of the first transfer pad is connected to the second sensing electrode in the first metal layer of the touch panel. Thus, it is possible for a touch control signal to be transmitted from the first transfer pad to the second sensing electrode. The upper metal layer in the first transfer pad is connected to the second transfer pad on the array substrate by the ball bond.

In the array substrate, an IC provides the touch control signal. Through a flexible printed circuit (FPC) pressed on the second transfer pad of the array substrate, the touch control signal is transmitted to the first transfer pad arranged on the color filter substrate via the second transfer pad and further to the sensing electrodes of the color filter substrate. Here, the IC can be arranged on the printed circuit board or the flexible printed circuit, or pressed directly on the array substrate.

The method of manufacturing the color filter substrate is as follows.

A washed glass substrate is placed on a transfer bracket, and then transferred into a sputtering device in which a chromium film is deposited on the glass substrate by a reactive sputtering.

A patterning process is performed on the chromium film by way of mask exposure so as to form a black matrix layer. The black matrix layer obtained from the patterning process consists of strips crossed with each other, which define blank regions. It should be understood by those skilled in the art that the shape of the black matrix units could be changed as desired.

Likewise, a metal layer, which may be made of Mo or Al, etc., is formed on the substrate by the reactive sputtering. The metal layer is not only formed on the black matrix layer but also extends partially to the outside of an effective light-emitting region. The metal layer extending the outside of the effective light-emitting region is patterned to form a square block structure used as the lower metal layer of the first transfer pad.

The first metal layer formed on the black matrix layer is likewise patterned to form a grid structure which is similar to the pattern of the black matrix layer and used as a first metal layer of the touch panel, the shape of the first metal layer is the same as that of the black matrix layer but the line width of the first metal layer is less than that of the black matrix units, such that when the color filter substrate is attached to the array substrate to form the liquid crystal display, the first metal layer is sheltered by the black matrix layer without affecting the transmittance of the liquid crystal display. In this embodiment, the first metal layer includes: a plurality of first sensing electrodes continuously provided in a longitudinal direction and a plurality of second sensing electrodes which are spaced by the continuously arranged first sensing electrodes in a transverse direction.

A first organic layer 104 is formed on the first metal layer. The first organic layer covers positions of the intersections between the first sensing electrodes and the second sensing electrodes formed in the first metal layer.

The first organic layer also covers the lower metal layer of the first transfer pad.

A via hole is formed in the first organic layer covering the second sensing electrodes, and metal is deposited in the via hole, forming the second metal layer used for bridging the second sensing electrodes, such that the second sensing electrodes are connected electrically.

Likewise, a via hole is also formed in the first organic layer covering the lower metal layer of the first transfer pad, metal is deposited in the via hole, and the upper metal layer of the first transfer pad is formed on the first organic layer. This step may be conducted simultaneously with the above step of manufacturing the second metal layer of the touch panel and the same metal material may be deposited in both steps. Any step between the transfer pad and the other region on the color filter substrate is very small, for the purpose of flatness.

A color filter layer, a second organic layer and an isolation layer are formed, and the techniques of manufacturing the color filter layer, the second organic layer and the isolation layer is common in forming the color filter substrate, and thus will not be described again herein.

The second transfer pad corresponding to the first transfer pad on the color filter substrate in a one-to-one relationship is formed on the array substrate. The color filter substrate is attached to the array substrate to form the liquid crystal display, and the first transfer pad is electrically connected to the second transfer pad through the ball bond. Thus, through a flexible printed circuit (FPC) pressed on the second transfer pad of the array substrate, a touch control signal provided by the IC is transmitted to the first transfer pad arranged on the color filter substrate via the second transfer pad and further to the sensing electrodes of the color filter substrate.

The panel structure of the color filter substrate according to this embodiment is different from that of the conventional color filter substrate for displaying in that a three-layer structure including the first metal layer, the first organic layer and the second organic layer is added to form the touch panel in the color filter substrate. If the three-layer structure is removed, the panel structure of the color filter substrate according to this embodiment becomes the same as the structure of a normal display panel, thus the flexibility of the product design may be enhanced, without a significant change to the techniques and a significant cost increase.

It is noted that the above description illustrates certain embodiments and the technical principles of the present invention. It will be understood by those skilled in the art that the present invention is not intended to be limited to the particular embodiments mentioned herein, and various changes, rearrangements and substitutions can be made by the person skilled in the art without departing from the scope of the invention. Therefore, although the invention has been described in detail in accordance with the discussed embodiments, the invention is not limited to the specific discussed embodiments and also can include the other equivalent embodiments without departing from the concept of the invention.

What is claimed is:

1. A liquid crystal display having an embedded touch panel, the liquid crystal display comprising:
   a color filter substrate;
   an array substrate;
   a liquid crystal molecule layer between the color filter substrate and the array substrate; and
   a touch panel integrated with the color filter substrate,
   wherein a plurality of first transfer pads are arranged on the color filter substrate and a plurality of second transfer pads are arranged on the array substrate, wherein locations of the first transfer pads correspond to locations of the second transfer pads, wherein the first transfer pads are electrically connected with the second transfer pads, and wherein the first and second transfer pads are used to transmit a touch control signal to the touch panel; and
   the color filter substrate comprises:
   a substrate;
   a black matrix layer arranged on the substrate, wherein the black matrix layer comprises a plurality of black matrix units;
   a first metal layer arranged on the black matrix layer, wherein the first metal layer comprises:
   a plurality of first sensing electrodes continuously arranged in a longitudinal direction, and
   a plurality of second sensing electrodes spaced by the continuously arranged first sensing electrodes in a transverse direction;
   a color filter layer formed on the first metal layer, wherein the color filter layer covers both the black matrix layer and the first metal layer and fills a space between the black matrix units;
   a via hole exposing a portion of the first metal layer in the color filter layer; and
   a second metal layer formed in the via hole and over the color filter layer to form a metal bridge, wherein the metal bridge contacts the second sensing electrodes, so that the touch panel formed by the first metal layer, the second metal layer, and the color filter layer between the first and second metal layers;
   or, the color filter substrate comprises:
   a substrate;
   a black matrix layer arranged on the substrate, wherein the black matrix layer comprises a plurality of black matrix units;
   a first metal layer arranged on the black matrix layer, wherein the first metal layer comprises:
   a plurality of first sensing electrodes continuously provided in a longitudinal direction; and
   a plurality of second sensing electrodes spaced by the continuously provided first sensing electrodes in a transverse direction;
   an organic layer formed on the first metal layer, wherein the organic layer covers both the black matrix layer and the first metal layer and fills a space between the black matrix units;
   a via hole which exposing a portion of the first metal layer in the organic layer;
   a second metal layer formed in the via hole and over the organic layer to form a metal bridge, wherein the metal bridge contacts the second sensing electrodes, so that a touch control layer being formed by the first metal layer, the second metal layer and the organic layer between the first and second metal layers, thereby integrating the touch panel into the color filter substrate; and
   a color filter layer arranged on both the second metal layer and the organic layer.

2. The liquid crystal display according to claim 1, wherein one of the first transfer pads are connected with one of the first sensing electrodes and the second sensing electrodes.

3. The liquid crystal display according to claim 1, wherein one of the first transfer pads comprises a lower metal layer, an upper metal layer and the color filter layer arranged between the upper and the lower metal layers, wherein a via hole is provided in the color filter layer, and wherein the upper metal layer and the lower metal layer are electrically connected together by the via hole.

4. The liquid crystal display according to claim 1, wherein the first transfer pad comprises a lower metal layer, an upper metal layer, and the organic layer arranged between the upper and the lower metal layer, wherein a via hole is provided in the organic layer, and wherein the upper metal layer and the lower metal layer are electrically connected together by the via hole.

5. The liquid crystal display according to claim 1, wherein the first transfer pad is provided at a signal transmitting side of the color filter substrate and in a region of the color filter substrate that is outside of an effective display region of the color filter substrate.

6. The liquid crystal display according to claim 1, wherein the number of the first transfer pads is at least 20.

7. The liquid crystal display according to claim 1, wherein the first transfer pad is shaped as a rectangle with a size from 50 µm×50 µm to 1000 µm×1000 µm.

8. The liquid crystal display according to claim 1, wherein the first transfer pad and the second transfer pad are electrically connected together by a ball bond.

9. A method of manufacturing a liquid crystal display with an embedded touch panel, comprising:
   providing a color filter substrate comprising a plurality of first transfer pads;
   providing an array substrate comprising a plurality of second transfer pads;
   attaching the color filter substrate to the array substrate;
   connecting the first transfer pads on the color filter substrate with the second transfer pads on the array substrate;
   injecting a liquid crystal molecule layer between the color filter substrate and the array substrate; and
   sealing the liquid crystal molecule layer with a seal agent;
   wherein the method further comprising:
   forming a black matrix layer on the color filter substrate, wherein the black matrix layer comprising a plurality of black matrix units;
   forming a first metal layer on the black matrix layer, wherein the first metal layer comprises a plurality of first sensing electrodes continuously arranged in a longitudinal direction and a plurality of second sensing electrodes spaced by the continuously arranged first sensing electrodes in a transverse direction;
   forming a color filter layer on the first metal layer, wherein the color filter layer covers both the black matrix layer and the first metal layer and fills a space between the black matrix units;
   forming a via hole which exposes a portion of the first metal layer in the color filter layer; and
   forming a second metal layer on the color filter layer to form a metal bridge, which contacts the second sensing electrodes via the via hole;
   or, the method further comprising:
   forming a black matrix layer on the color filter substrate;
   forming a first metal layer on the black matrix layer, wherein the first metal layer comprises a plurality of first sensing electrodes continuously arranged in a longitudinal direction and a plurality of second sensing electrodes spaced by the continuously arranged first sensing electrodes in a transverse direction;
   forming an organic layer on the first metal layer, wherein the organic layer covers both the black matrix layer and the first metal layer and fills a space between the black matrix units;
   forming a via hole which exposes a portion of the first metal layer on the organic layer;
   forming a second metal layer on the organic layer to form a metal bridge, wherein the metal bridge contacts the second sensing electrodes via the via hole; and
   forming a color filter layer which is over both the second metal layer and the organic layer.

10. The method of manufacturing a liquid crystal display with an embedded touch panel according to claim 9, wherein forming the first transfer pad comprises:
    forming a lower metal layer;
    forming a color filter layer on the lower metal layer;
    forming a via hole in the color filter layer; and
    forming an upper metal layer on the color filter layer, wherein the lower metal layer is electrically connected with the upper metal layer by the via hole.

11. The method of manufacturing a liquid crystal display with an embedded touch panel according to claim 9, wherein forming the first transfer pad comprises:
    forming a lower metal layer;
    forming the organic layer on the lower metal layer;
    forming a via hole in the organic layer, and
    forming an upper metal layer on the organic layer, wherein the lower metal layer is electrically connected with the upper metal layer by the via hole.

12. The method of manufacturing a liquid crystal display with an embedded touch panel according to claim 9, wherein the lower metal layer of the first transfer pad and the first metal layer of the touch panel are formed simultaneously, and the upper metal layer of the first transfer pad and the second metal layer of the touch panel are formed simultaneously.

13. The method of manufacturing a liquid crystal display with an embedded touch panel according to claim 9, wherein one of the first transfer pads is provided at a signal transmitting side of the color filter substrate and in a region of the color filter substrate that is outside of an effective display region of the color filter substrate.

14. The method of manufacturing a liquid crystal display with an embedded touch panel according to claim 9, further comprising forming the first transfer pads on the color filter substrate, wherein the first transfer pads are each shaped as a rectangle with a size from 50 µm×50 µm to 1000 µm×1000 µm.

15. The method of manufacturing a liquid crystal display with an embedded touch panel according to claim 9, wherein the first transfer pads and the second transfer pads are each electrically connected together by a ball bond.

* * * * *